United States Patent Office 3,448,007
Patented June 3, 1969

3,448,007
STEAM-COOLED NUCLEAR REACTOR
Ludolf Ritz, Karlsruhe-Waldstadt, Germany, assignor to Gesellschaft fur Kernforschung m.b.H., a corporation of Germany
Filed Aug. 19, 1965, Ser. No. 481,013
Claims priority, application Germany, Aug. 19, 1964,
G 41,351
Int. Cl. G21c 15/02
U.S. Cl. 176—59                                                7 Claims

ABSTRACT OF THE DISCLOSURE

A steam-cooled nuclear reactor with a cooling steam generator arranged in a common pressure vessel with the reactor core and therebelow, the pressure vessel having an internal vertically extending duct for passing superheated steam into the steam generator to evaporate condensate introduced therein, the steam generator and core being separated by a steam distribution header through which the superheated steam duct passes to feed superheated steam to the bottom of the steam generator, the saturated steam generated by interaction of superheated steam with condensate being delivered from the steam generator through the distribution header and fed back into the core for cooling same.

---

Figure 1:
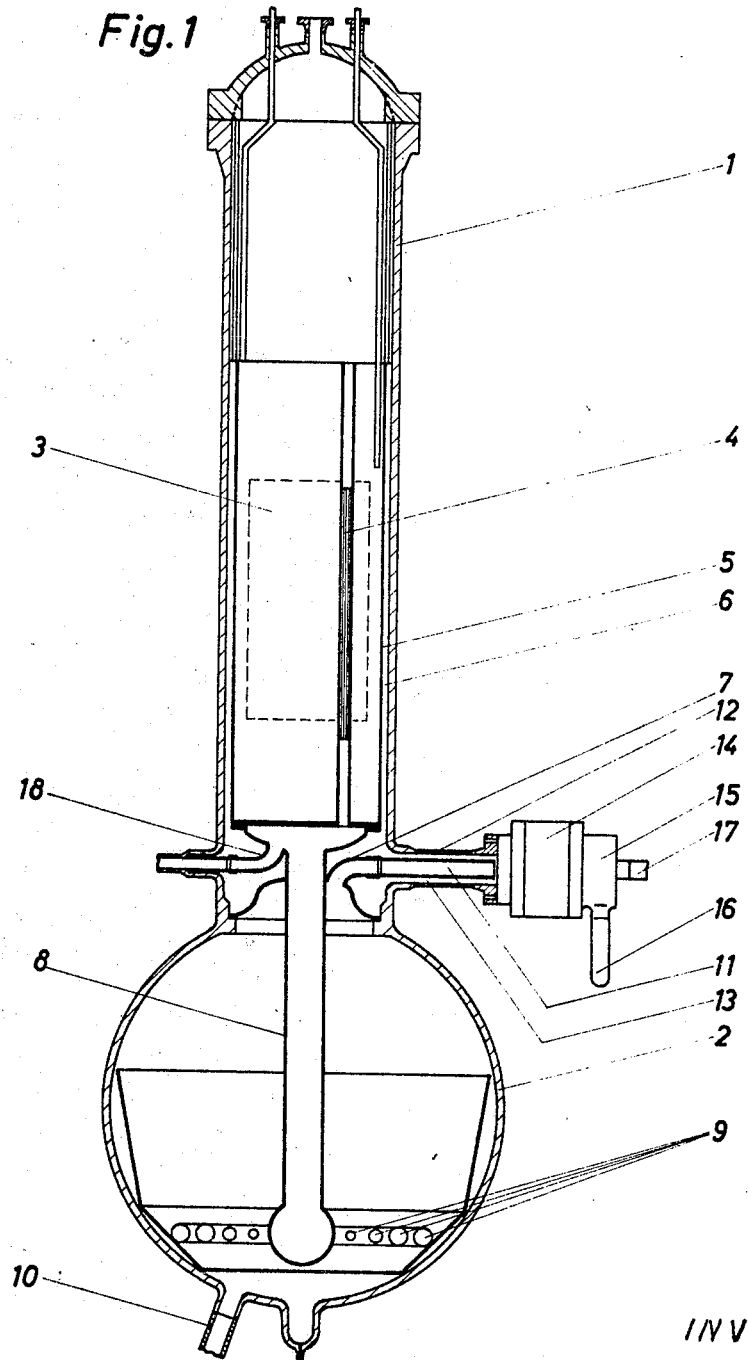

The invention relates to a steam-cooled nuclear reactor with a cooling steam generator installed in the common pressure vessel below the core and penetrated in an essentially vertical direction by a superheated-steam duct, and circulating blowers for the circulating cooling steam attached to the outside of the pressure vessel.

Nuclear reactors using saturated steam or slightly superheated steam for the coolant have been known for some time. These reactors show the advantage of permitting the superheated-steam from the reactor to be fed directly to a working turbine. The generated heat does not have to be transferred to a working cycle first through heat exchangers.

The Löffler cycle, which has been known for a long time from literature for the application to conventional power stations, has achieved particular importance also for nuclear reactor installations in which the condensate generated in the steam cycle is directly evaporated by superheated steam from the reactor by either injecting the condensate into the superheated steam or blowing the superheated steam into the condensate or feeding the generated saturated steam through the core for subsequent cooling.

This invention relates to a particularly favorable design of a nuclear reactor plant operating by the Löffler principle with a cooling steam generator installed in the common pressure vessel below the core and penetrated in an essentially vertical direction by a superheated-steam duct, and circulating blowers for the circulating cooling steam attached to the outside of the pressure vessel.

In the invention there is a steam distribution header installed between the core and the steam generator through which the superheated steam from the core is fed to the bottom of the steam generator via the superheated-steam duct and the saturated steam generated in the steam generator is fed into the core for cooling.

It is particularly advantageous from the design point of view to have the circulating blower take in the cooling steam from the steam generator through the inner tube of a concentric tube arrangement and feed it into the core through the annular space between the outer and the inner tubes. In this way it is possible to combine the steam distribution headers in the pressure vessel between steam generator and core into one design element subjected to relatively high temperature differences, but to a low over pressure only. This largely avoids penetrations of hot tubes through the pressure vessel.

In one particularly favorable execution of the reactor according to the invention the cooling steam coming from the circulating blower is first made to flow upward through an annular space between the core and the reactor vessel and then downward through the core. This maintains the reactor vessel at the same temperature, i.e. the temperature of saturated steam, practically everywhere and helps to reduce thermal stresses in the wall of the vessel to a minimum. The steam superheated in the core is carried through the superheated steam duct vertically penetrating the steam generator to the bottom of the steam generator and blown into the condensate there.

The circulating blower may be driven electrically. It is more favorable, however, to equip it with a steam drive and operate it by the superheated steam from the reactor. In this connection a particularly advantageous design would be to feed the whole amount of useful steam taken from the cooling cycle first through the steam drive and have it give off part of its temperature there so that no extremely hot steam acts upon the turbine generating the useful power.

The reactively small steam drive of the circulating blower operating on extremely hot steam is easily manufactured out of highly temperature-resistant material because of its small dimensions. Further details of the invention are described more closely on the basis of the figures:

FIG. 1 shows one way of executing the reactor under the invention which essentially consists of a cylindrical reactor vessel 1 vertically positioned upon the spherical steam generator 2. The reactor vessel 1 contains the core 3 formed by rod-type fuel elements 4. Between the core blanket 5 and the reactor vessel 1 a space 6 has been provided through which the cooling steam may be fed into the area above the core 3 from where it is fed downward through the core 3. In the bottom part of the reactor vessel 1 a steam distribution 7 header has been arranged between the core 3 and the steam generator 2 combining the superheated steam coming from the core 3 and feeding it to the bottom of the steam generator through a superheated steam duct 8 vertically penetrating the steam generator, from where it is blown into the condensate fed into the steam generator 2 through the condensate duct 10 from perforated annular ducts 9. The steam generator is closed at the top by the steam distribution header 7 from which a saturated-steam duct 11 leads to the circulating blowers 14 attached to the sides of the reactor vessel 1 between steam generator 2 and core 3. The saturated-steam duct 11 is concentrically placed inside the pressure duct 12 which makes it possible to feed the cooling steam back to the reactor vessel through the space 13 between the two ducts and again into the core 3 through the space 6 between the core blanket 5 and the reactor vessel 1.

Consequently, the superheated steam which leaves the core 3 is conducted through the superheated steam duct down to the bottom of the steam generator 2 and is blown into the condensate, introduced through duct 10, through the perforations of the annular duct 9 which communicates with the duct 8. The saturated steam produced by the mixing of condensate and superheated steam passes through duct 11 and through the circulating blowers 14 back through the annular duct 12 and then up through the spacing 6 to cool the core blanket 5 and core 3.

The circulating blower 14 is driven by a steam drive 15 which is operated by superheated steam taken from the reactor through duct 18, the duct 18 having a superheated steam bleed tap connection (not shown) which is connected to the steam supply duct 16 of the steam drive 15, a duct 17 being the steam discharge of the drive 15, which duct 17 can be connected to transmit steam to power other turbines or machines (not shown). As shown in FIG. 1 the superheated steam may be extracted at the distribution header 7 via the useful-steam duct 18.

Figure 2:
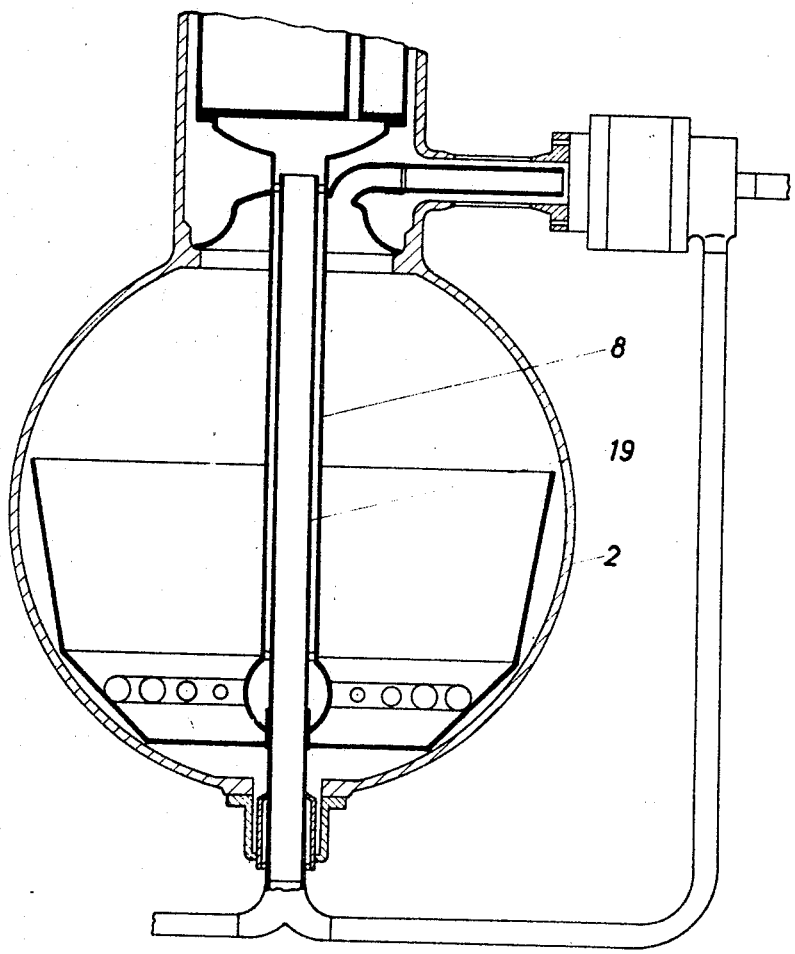

However, as this duct also would have to pass through the cylindrical reactor vessel 1 it is better to feed the useful steam, in accordance with FIG. 2 through a useful steam duct 19 concentrically arranged within the superheated steam inlet duct and exiting the steam generator at the lower end thereof. With the steam duct 19 thus brought out the steam generator and its pressure vessel, an extraction duct can be connected to duct 19 and run to the inlet of steam drive 15.

The possibilities of executing the invention are not restricted to the example described herein. For instance, it would be a disadvantage just to increase the design dimensions by a corresponding measure in order to increase the power of the reactor. This would unnecessarily increase the steam space in the steam generator and, at a likewise increased condensate level in the steam generator, also the pressure loss of circulating steam. For this reason, it may be more favorable in large installations under certain circumstances to design the steam generator as a horizontal cylindrical vessel.

Of course, the idea of the invention is not restricted to reactors having rod-type fuel elements. In a favorable design of the reactor for spherical fuels the reactor vessel may also have a spherical shape, e.g. in which case the fuel elements are piled up or packed in a perforated spherical shell. Between the spherical shell and reactor vessel a space is provided through which the cooling steam is fed into the core and radially flows toward the inside of the piled up or packed fuel elements. From a central position of the piled-up fuel elements 4, the steam superheated in the core 3 is fed downward into the steam generator 2 through a superheat steam duct connected with it, such superheat steam duct being similar to the duct 8.

The reactor according to the invention offers the special advantages of a simple and compact design. It is therefore suited likewise for power reactor as well as a chemical reactor with e.g., the cylindrical or spherical parts of the core, respectively, being set up within a chemical conversion plant requiring nuclear radiation for a reaction process. For the sake of completeness it may be mentioned that when using the reactor according to the invention as a power reactor the usual radiation shields have to be put up around the core.

I claim:
1. Steam-cooled nuclear reactor with a cooling steam generator arranged in the common pressure vessel below the core penerated in an essentially vertically direction by a superheated-steam duct, and circulating blowers for the circulating cooling steam attached to the outside of the pressure vessel, characterized by a steam distribution header (7) being installed between core (3) and steam generator (2) through which the superheated steam is fed from the core (3) to the bottom of the steam generator (2) via the superheated-steam duct (8) and the saturated steam generated in the steam generator (2) is fed into the core (3) for cooling.

2. Nuclear reactor according to claim 1, characterized by the steam distribution header (7) consisting of two collecting cones penetrating each other; the cone closing the core and taking up superheated steam changing into the superheated-steam duct (8), the cone closing the steam generator (2) changing into a cooling steam duct (11) leading out of the reactor vessel (1) to the circulating blower (14).

3. Nuclear reactor according to claim 2, characterized by the circulating blower (14) being flanged into the free end of coaxial ducts (11, 12) consisting of the cooling steam duct (11) leading to the circulating blower (14) as the inner duct and a pressure duct (12) connected with the reactor vessel (1); the cooling steam out of the inner duct (11) is fed through the annular space (13) back to the reactor vessel (1) and through an annular space (6) between the reactor vessel (1) and the core blanket (5) to the core (3).

4. Nuclear reactor according to claim 2, characterized by a discharge duct for useful steam (19) emerging at the bottom of the steam generator (2) being installed coaxially in the superheated-steam inlet duct (8) to the steam generator (2).

5. Nuclear reactor according to claim 1, characterized by a steam drive (15) connected to a circulating blower (14) to drive same to feed saturated steam generated in the steam generator (2) into the core (3) for cooling same.

6. Nuclear reactor according to claim 5, characterized by partial expansion turbines being used for the steam drive.

7. Nuclear reactor according to claim 1, including a cylindrical reactor vessel and spherical steam generator, characterized by the reactor vessel (1) having at least half the diameter of the steam generator (2).

References Cited

UNITED STATES PATENTS

| | | | |
|---|---|---|---|
| 3,108,938 | 10/1963 | Nettel et al. | 176—60 X |
| 3,132,999 | 5/1964 | Linsenmeyer | 176—54 |
| 3,210,254 | 10/1965 | Fortescue | 176—60 |
| 3,227,620 | 1/1966 | Cutts et al. | 176—60 |
| 3,231,474 | 1/1966 | Jones et al. | 176—56 |

FOREIGN PATENTS 961,277   6/1964   Great Britain.

REUBEN EPSTEIN, *Primary Examiner.*

U.S. Cl. X.R.
176—55, 60

U. S. PATENT OFFICE

UNITED STATES PATENT OFFICE

CERTIFICATE OF CORRECTION

Patent No. 3,448,007            Dated June 3, 1969

Ludolf Ritz

It is certified that errors appear in the above-identified patent and that said Letters Patent are hereby corrected as shown below:

Col. 3, line 13, after "out" insert --of--. Col. 3, line 42, "advantages" should read --advantage--. Col. 3, line 54, "vertica should read --vertical--. Col. 4, line 25, "claim 2" should read --claim 1--.

SIGNED AND SEALED

MAR 24 1970

(SEAL)
Attest:

Edward M. Fletcher, Jr.
Attesting Officer

WILLIAM E. SCHUYLER, JR.
Commissioner of Patents